United States Patent
Kobayashi

(10) Patent No.: US 6,810,593 B2
(45) Date of Patent: Nov. 2, 2004

(54) METHOD OF IMPROVING RRO OF WHEEL RIM

(75) Inventor: Hiroyuki Kobayashi, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 10/645,558

(22) Filed: Aug. 22, 2003

(65) Prior Publication Data

US 2004/0045177 A1 Mar. 11, 2004

(30) Foreign Application Priority Data

Aug. 22, 2002 (JP) .................................. 2002-242501

(51) Int. Cl.$^7$ .............................................. G01B 5/20
(52) U.S. Cl. ........................... 33/203; 33/550; 33/600; 33/203.15; 73/146; 73/462
(58) Field of Search ................... 33/203, 600, 203.15, 33/203.16, 550; 73/146–146.8, 459–462

(56) References Cited

U.S. PATENT DOCUMENTS

| | | | |
|---|---|---|---|
| 6,568,096 B1 * | 5/2003 | Svitkin et al. | 33/550 |
| 6,735,878 B2 * | 5/2004 | Lie | 33/203 |
| 2003/0010105 A1 * | 1/2003 | Kunsch et al. | 73/146 |
| 2003/0041666 A1 * | 3/2003 | Parker | 73/462 |

* cited by examiner

Primary Examiner—Diego Gutierrez
Assistant Examiner—Yaritza Guadalupe
(74) Attorney, Agent, or Firm—Birch, Stewart, Kolasch & Birch, LLP

(57) ABSTRACT

A method of reducing an n-order component of a radial run out (RRO) of a wheel rim is disclosed, wherein an average Y of RRO Y1 and RRO Y2 of the bead seats is obtained around the wheel rim; the peak-to-peak amplitude X of the n-order component of the average Y is obtained; minimum position(s) at which the n-order component becomes minimum is found to determine deep position(s) P on the wheel rim corresponding to the minimum position(s); a corrective tape having a thickness t of 0.1 to 0.5 mm is applied to the bead seat(s) at each deep position P, wherein the length L of the corrective tape is determined by the following precision expression (1) or alternatively simplified expression (2)

$$L0 = \frac{R}{\pi \times n} \times \arcsin\left(\frac{X}{t \times a \times 1.3}\right) \quad (1)$$

$$L0 = \frac{100 \times R \times X}{360 \times t \times a \times n} \quad \text{where } 0 < \frac{L0}{R} < 0.28 \quad (2)$$

wherein "a" is a multiplier which is 0.5 when the corrective tape is applied to one of the bead seats or 1.0 when the corrective tape is applied to both of the bead seats; R is the circumference in mm of the bead seat; and the unit of the argument of arcsine is radian.

3 Claims, 6 Drawing Sheets

METHOD OF IMPROVING RRO OF WHEEL RIM

This nonprovisional application claims priority under 35 U.S.C. §119(a) on Patent Application No(s). 2002-242501 filed in JAPAN on Aug. 22, 2003, which is(are) herein incorporated by reference.

BACKGROUND OF THE INVENTION

The present invention relates to a method of improving radial run out (RRO) of a wheel rim, more particularly to a method of reducing an n-order component of RRO.

The radial force variation (RFV) of a vehicle wheel, namely, an assembly of a rim and a pneumatic tire is one of factors to be considered when decreasing vibrations of a vehicle during running especially high-speed running.

In order to reduce vehicle vibrations, in the laid-open Japanese paten application JP-A-8-66957, the tire tread is buffed to reduce the radial run out (RRO) and thereby to reduce RFV. In the laid-open Japanese paten application JP-A-7-156293, in order to reduce RRO, a balance weight is applied to the inner surface of a pneumatic tire.

These measures are for the tires. But the wheel rims also have RRO of which value usually ranges from about 0.1 mm to about 0.3 mm. when the wheel rim has a relatively large RRO, even if the RFV of a tire and rim assembly is reduced by adjusting the tire as above under particular running conditions (e.g. speed range), there is a possibility of increasing in the RFV under different conditions.

SUMMARY OF THE INVENTION

It is therefore, an object of the present invention to provide a method of improving RRO of a wheel rim, by which the RRO and RFV of an assembly of the wheel rim and a pneumatic tire can be effectively improved.

According to one aspect of the present invention, a method of improving radial run out (RRO) of a wheel rim having a pair of bead seats for tire beads, comprising measuring a radial run out Y1 of one of the bead seats around the wheel rim, measuring a radial run out Y2 of the other bead seat around the wheel rim, finding an average Y of the radial run out Y1 and radial run out Y2 around the wheel rim, analyzing the average Y around the wheel rim to find out an n-order component which is largest in the peak-to-peak amplitude, obtaining the peak-to-peak amplitude of the n-order component as RRO value X, finding minimum position(s) at which the n-order component becomes minimum and determining deep position(s) P on the wheel rim corresponding to the minimum position(s), determining the length L of a corrective tape as a value within a range of from 0.8 to 1.02 times a length L0, applying a corrective tape to one of or alternatively each of the bead seats at each said deep position P, wherein the corrective tape is made of a synthetic resin and has a thickness t of from 0.1 to 0.5 mm, and said length L0 is defined by the following precision expression (1) or alternatively simplified expression (2)

$$L0 = \frac{R}{\pi \times n} \times \arcsin\left(\frac{X}{t \times a \times 1.3}\right) \quad (1)$$

$$L0 = \frac{100 \times R \times X}{360 \times t \times a \times n} \quad \text{where } 0 < \frac{L0}{R} < 0.28 \quad (2)$$

wherein
L0 is a value in mm,
X is a value in mm,
n is a positive integer of the order number of the n-order component,
t is a value in mm,
a is a multiplier which is 0.5 when the corrective tape is applied to one of the bead seats or 1.0 when the corrective tape is applied to both of the bead seats,
R is the circumference in mm of the bead seat,
pi is the circle ratio (=3.14159 - - - ), and
the unit of the argument of arcsine is radian.

DESCRIPTION OF THE PREFERRED EMBODIMENTS

Embodiments of the present invention will now be described in detail in conjunction with the accompanying drawings.

Figure 1:
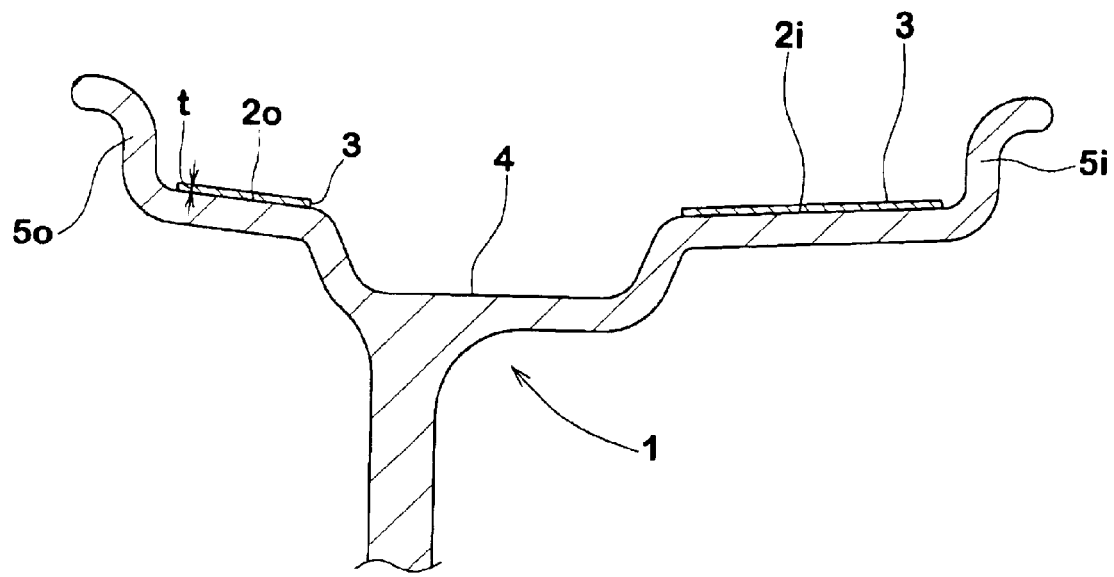
FIG. 1 is a partial cross sectional view of a wheel rim taken along a plane including the rotational axis.

FIG. 1 show a part of a wheel rim 1 on which a pneumatic tire (not shown) is mounted. The wheel rim 1 comprises a pair of bead seats 2o and 2i, a rim well 4 therebetween, a pair of flanges 5o and 5i. Here, the suffix "o" and "i" indicates the position "outside" and "inside" relating to the vehicle.

According to the present invention, a method of improving radial run out (RRO) of the wheel rim 1 comprises measuring the RRO Y1 of one bead seat 2o around the wheel rim, measuring the RRO Y2 of the other bead seat 2i around the wheel rim, obtaining the average Y of the RRO Y1 and RRO Y2 around the wheel rim, analyzing the average Y around the wheel rim as a wave of one cycle to find out an n-order component which is largest in the peak-to-peak amplitude thereof, getting the peak-to-peak amplitude and the order number "on" of the largest component, determining a position or positions on the wheel rim corresponding to a position or positions at which the largest n-order component takes a minimum value, determining whether a corrective tape 3 is applied to one of or each of the bead seats,
computing the length of the corrective tape,
cutting the tape into the computed length,
applying a tape to the bead seat at each determined position on the wheel rim.

Figure 3:
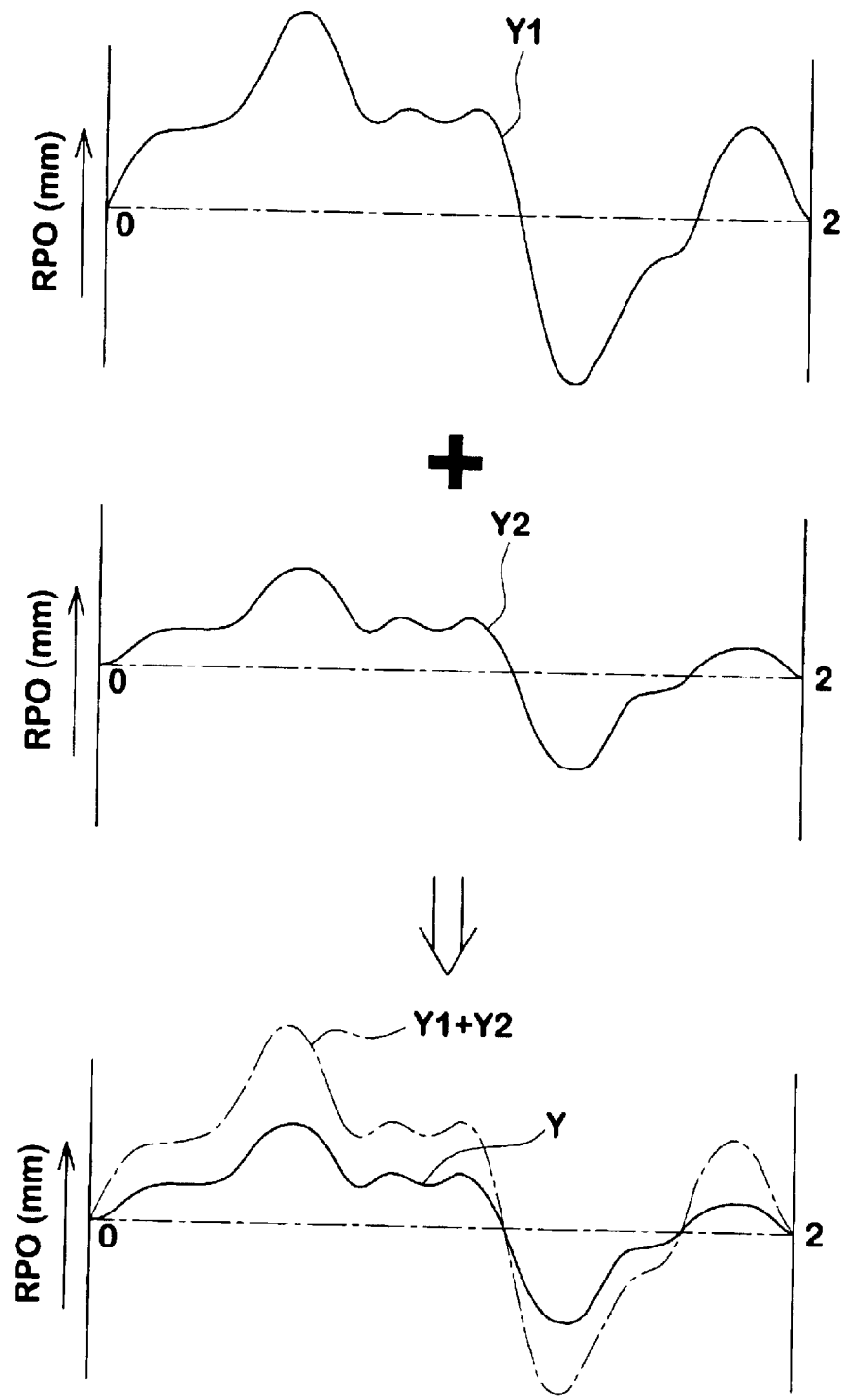
FIG. 3 shows a generation of average Y of RRO Y1 and Y2 at right and left bead seats.

FIG. 3 is a conceptual diagram of obtaining the average Y, wherein Y1 shows an example wave form of the radial run out (RRO) of the outside bead seat 2o, and Y2 shows an example wave form of the radial run out (RRO) of the inside bead seat 2i, each measured around the wheel rim (namely, center angle of from 0 to 2pi). Y is the wave form of the average (Y1+Y2)/2, namely arithmetic mean of the RRO Y1 and the RRO Y2 obtained around the wheel rim.

Using fast Fourier transform (FFT) technique, the average Y is analyzed for n-order components thereof, regarding the variation of the average Y around the wheel rim as a wave of one cycle (0 to 2 pi), so as to find out a component whose RRO value X is largest.

Figure 4A:
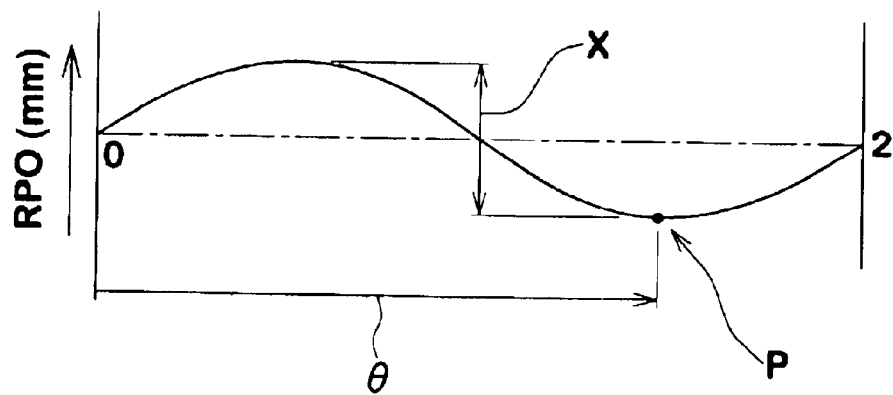
FIG. 4(a) shows a wave form of a first-order component.
Figure 4B:
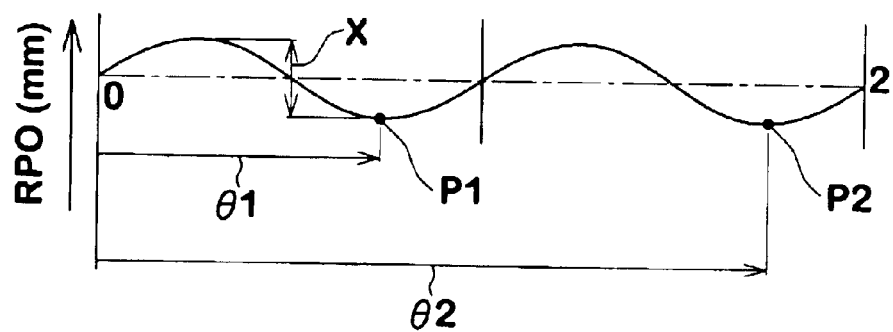
FIG. 4(b) shows a wave form of a second-order component.

Here, the RRO value X of an n-order component means a peak-to-peak amplitude of the wave as shown in FIG. 4(a) and FIG. 4(b). FIG. 4(a) shows an example of the first-order component. FIG. 4(b) shows an example of the second-order component.

In the n-order component whose RRO value X is largest, a position (P, P1, P2) where the n-order component becomes minimum is found out, for example as a phase angle θ, θ1, θ2 from a reference position on the wheel rim 1 and the position on the wheel rim (hereinafter, the "deep position") corresponding to the found out position of the minimum is determined. Accordingly, the deep position P occurs "n" times around the rim, for example two times in case of the second-order (n=2) component as shown in FIG. 4(b).

Generally speaking, the first-order component has the largest RRO value X when compared with other order components. Therefore, by minimizing the RRO value of the first-order component, the overall RRO value can be effectively reduced. However, there is a possibility that another component, for example the second-order component, becomes largest. According to the present invention, therefore, it is examined which component has the largest RRO value, and the found-out largest component is minimized.

To each deep position P on the wheel rim 1 corresponding to each minimum position of the largest n-order component, a corrective tape 3 is applied.

The tape 3 may be applied to one of the bead seats 2 only or alternatively each of the bead seats 2. In the former case, the undermentioned multiplier "a" is set to a value of 0.5. In the later case, the multiplier "a" is set to a value of 1.0.

The corrective tape 3 is an adhesive tape made of a synthetic resin base, and one side thereof is coated with an adhesive material. The thickness t thereof is set in a range of 0.1 to 0.5 mm, preferably 0.2 to 0.4 mm. The width of the tape 3 is, as shown in FIG. 1, set to be almost same as the width of the bead seat 2o, 2i. In this example, as the outside bead seat 2o is narrower than the inside bead seat 2i, the tape width is accordingly smaller in the outside bead seat 2o than the inside bead seat 2i.

For the corrective tape 3, various materials may be usable. But, if the material is a relatively soft synthetic resin, such as polyvinyl chloride, whose compression is more than 10% at a load of 3 Mpa, then the thickness t1 before applied is set to satisfy t=0.9×t1.

If the thickness t is less than 0.1 mm, it is difficult to improve RRO. If the thickness t is more than 0.5 mm, air leakage becomes liable to occur at the both end of the corrective tape 3.

The circumferential length L of the corrective tape 3 used in each deep position P is set in a range of from 0.8 to 1.2 times a length L0.

The length L0 is defined by the following precision expression (1) or a simplified expression (2).

$$L0 = \frac{R}{\pi \times n} \times \arcsin\left(\frac{X}{t \times a \times 1.3}\right) \qquad (1)$$

$$L0 = \frac{100 \times R \times X}{360 \times t \times a \times n} \quad \text{where } 0 < \frac{L0}{R} < 0.28 \qquad (2)$$

wherein
the unit of the argument of arcsine is radian, and the symbols are as follows.
L0: the value of the length in mm
x: the RRO value in mm of the above-mentioned largest n-order component of the average Y
n: the number of order of the largest n-order component
t: the thickness in mm of the corrective tape
a: a multiplier which is 0.5 when the corrective tape is applied to one of the bead seats 2 or 1.0 when the corrective tape is applied to both of the bead seats 2
R: the circumference in mm of the bead seat of the wheel rim
pi: the circle ratio (=3.14159 - - - )

The following are example computations when the conditions are as follow: the largest component is the first-order component, namely, n=1; the RRO value X is 0.2 mm; the thickness t of the corrective tape 3 is 0.4 mm; the multiplier "a"=1, namely, the tape is applied to each bead seat 2; and the circumference R of the bead seat is 1200 mm.

$$L0 = \{R/(pi \times n)\} \times \arcsin\{X/t \times a \times 1.3\} \qquad \text{Expression (1)}$$
$$= \{1200/(3.14 \times 1)\} \times \arcsin\{0.2/(0.4x \times 1 \times 1.3)\}$$
$$= 382.2 \times \arcsin(0.3846)$$
$$= 382.2 \times 0.3947$$
$$= 150.9 \text{ mm}$$

$$L0 = (100 \times R \times X)/(360 \times t \times a \times n) \qquad \text{Expression (2)}$$
$$= (100 \times 1200 \times 0.2)/(360 \times 0.4 \times 1 \times 1)$$
$$= 24000/144$$
$$= 166.7 \text{ mm (this value is 1.1 times 150.9 mm)}$$

As the ratio L0/R is 166.7/1200=0.139 which is within the range of 0 to 0.28, Expression (2) is applicable, and it is not necessary to change the thickness t.

Figure 2:
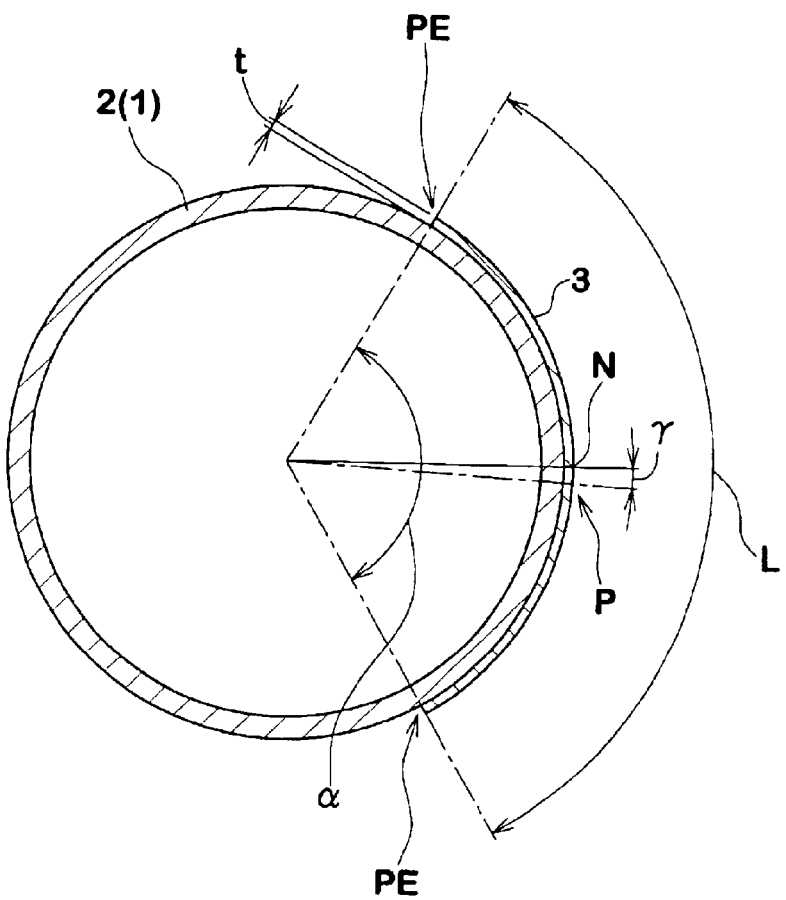
FIG. 2 is a schematic cross sectional view of the wheel rim taken along a plane perpendicular to the rotational axis at a position in a bead seat.

Therefore, a corrective tape 3, whose length is 0.8 to 1.2 times 150.9 mm in case of Expression (1), is applied to each of the bead seats 2 in the solo deep position P (because n=1) as shown in FIG. 2.

In any case, the circumferential displacement γ of the middle point N of the length L of the corrective tape 3 from the deep position P must be limited to under 5 degrees as a central angle as shown in FIG. 2.

Preferably, the ratio L0/R of the length L0 to the circumference R is set in a range of 1/36 to 1/2n (namely, central angle α=10 to 180/n degrees.), more preferably 1/12 to 1/3n (namely, central angle α=30 to 120/n degrees.)

Figure 5:
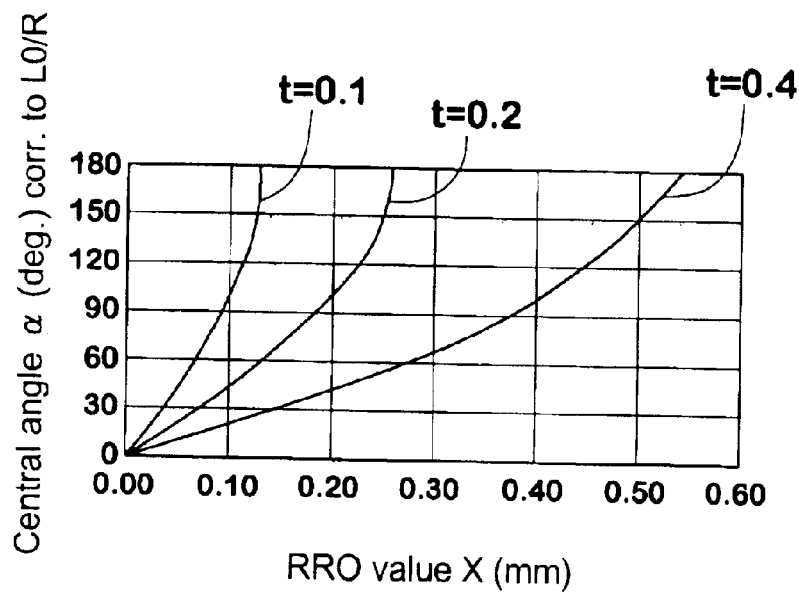
FIG. 5 is a graph showing loci of the expression (1).

FIG. 5 shows the loci of the expression (1) under the following specific conditions (t=0.1, n=1, a=1), (t=0.2, n=1, a=1) and (t=0.4, n=1, a=1), taking the RRO value X on the horizontal axis and the ratio L0/R converted to the central angle α on the vertical axis.

AS shown in FIG. 5, when the central angle α is in a range of from 0 to 100 degrees, namely, L0/R is from 0 to 0.28, the relationship between the RRO value X and the ratio L0/R is almost linear. This linear section was regression analyzed and the above-mentioned simplified expression (2) was obtained. Therefore, the simplified expression (2) can be used when the ratio L0/R is in the range of from 0 to 0.28.

Figure 6:
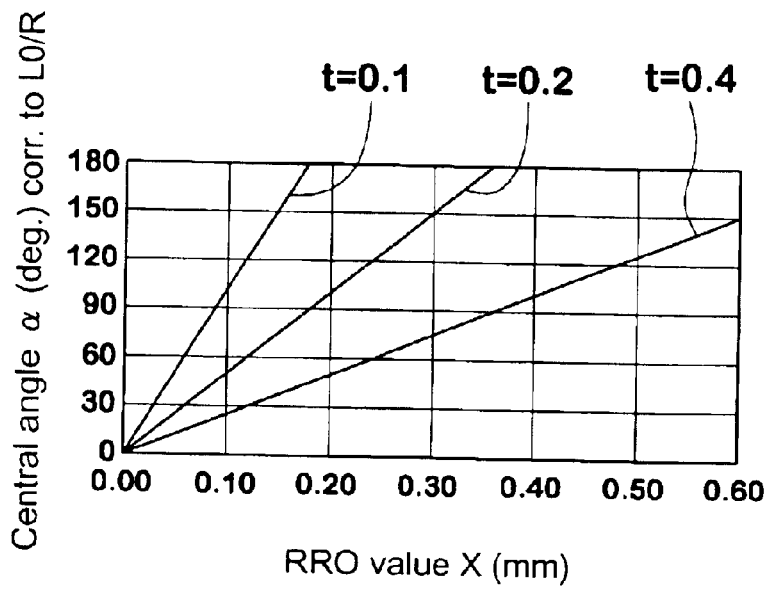
FIG. 6 is a graph showing loci of the expression (2).

FIG. 6 shows the loci of the expression (2) under the same conditions as above. The loci correspond to the regression lines of the loci of the expression (1). When the ratio L0/R is in a range of from 0 to 0.28 or a central angle α is in a range of from 0 to 100 degrees, the expressions (2) well approximates to the expressions (1). However, if the ratio L0/R exceeds 0.28, the difference becomes large. Therefore, in the computed results of the expressions (2), if the ratio L0/R exceeds 0.28, the thickness t is changed so that the ratio L0/R becomes less than 0.28.

Figure 7:
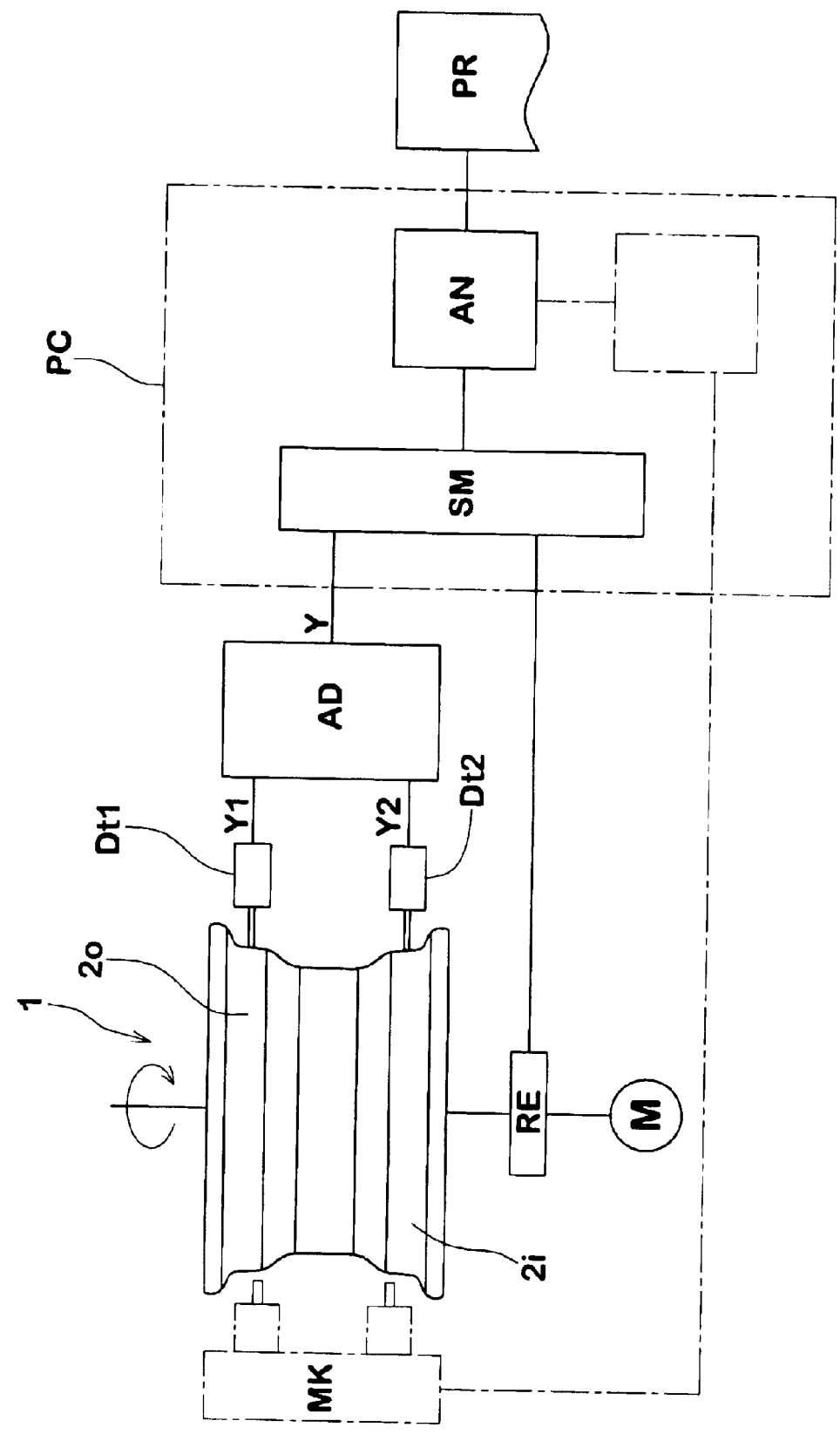
FIG. 7 is a diagram for explaining an apparatus for determining the applying length and position of the corrective tape.
Figure 8:
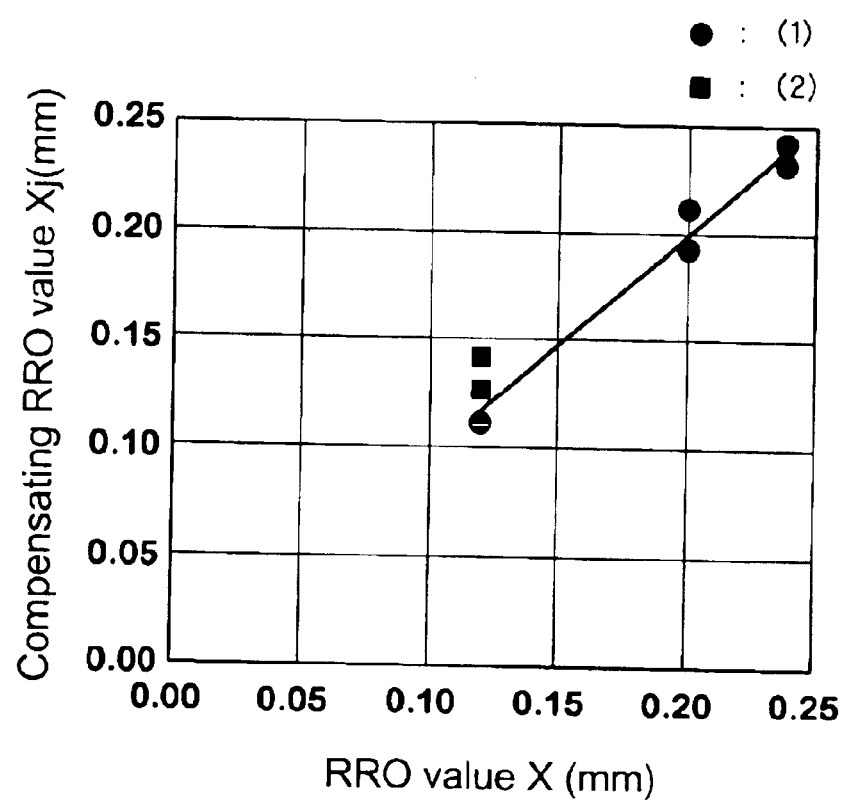
FIG. 8 is a graph showing the test results.

FIG. 7 shows an apparatus for determining the length and position of the corrective tape. In this embodiment, the apparatus comprises

- a rim mount (not shown) for a wheel rim 1 which is rotatable around the axis of the wheel rim,
- an electric motor M for rotating the wheel rim on the rim mount,
- a rotary encoder RE for detecting the rotation angle of the wheel rim,
- two displacement transducers Dt1 and Dt2 for detecting the radial run out of the bead seats 2o and 2i, respectively,
- an adder AD of the output signals (Y1 and Y2) of the two transducers Dt1 and Dt2,
- a sampler SM for sampling the added signal (Y1+Y2) based on the output signal of the rotary encoder RE,
- a FFT-based analyzer AN for n-order components,
- an output device PR such as a printer and display.

The wheel rim 1 is attached to the rim mount and rotated. During rotating the wheel rim 1, the two transducers Dt1 and Dt2 contact with the respective bead seats 2o and 2i and output the displacement in the radial direction as analog signals (Y1 and Y2), which are given to the adder AD. The adder AD outputs the sum (Y1+Y2). The sampler SM makes sampling of the analog signal representing the sum (Y1+Y2) and digitizes this analog signal, as the wheel rim rotates, according to the output signal of the rotary encoder RE, and generates a series of digital data representing the sum (Y1+Y2) at a small regular intervals (central angles) around the rim. The FFT-based analyzer AN treats the digital data as the average (Y1+Y2)/2 and analyzes these data for n-order components (usually, "n"=1 to 6 or 7 at most) and outputs the amplitude (x) of each component and the minimum positions P using the output device PR. The output form may be a list of these numerical data, but graphs as shown in FIGS. 3, 4(a) and 4(b) and the list are preferred. Using these output data, a component having the largest amplitude X, the order number "n" and the minimum position(s) P are determined by a human person. Further, the length of the tape is computed as explained above using the expression (1) or (2).

In order to save the human power in determining the largest component and detecting the position P on the wheel rim, as shown in FIG. 7 by an imaginary line, it is possible to utilize a computer PC and provide a device MK for marking the position of each tape on the wheel rim during rotating using a rapid dry paint for example. Here, the marking position may be the very position P or end positions PE between which the tape extends as shown in FIG. 2. The computer PC determines, from the analyzed data, a component having the largest amplitude X, the order number "n" and the minimum position(s) P, and according to the output of the rotary encoder RE, the timing of operating the marking device MK is computed and operates the marking device MK to provide marking on the wheel rim. The marking device MK may be a stamper, spray or the like.

Confirmation Test

Using three wheel rims whose largest components were the first order components having RRO value X of 0.12 mm, 0.20 mm and 0.40 mm, the confirmation test was conducted, wherein the tape whose length L0 was computed by the expression (1) or (2) was applied to each of the bead seat (namely, a=1) at its solo deep position P, and the measurement and analysis were made as explained above in order to obtain the compensated RRO value X' of the first-order component. In Table 1, the compensating RRO value xj (=x−x') by the tape is shown.

TABLE 1

| Wheel rim | Ex. 1 | Ex. 2 | Ex. 3 | Ex. 4 | Ex. 5 | Ex. 6 | Ex. 7 | Ex. 8 |
|---|---|---|---|---|---|---|---|---|
| RRO value X(mm) | 0.12 | 0.12 | 0.12 | 0.12 | 0.2 | 0.2 | 0.24 | 0.24 |
| Corrective tape Thickness t(mm) | 0.2 | 0.2 | 0.4 | 0.4 | 0.2 | 0.4 | 0.2 | 0.4 |
| Expression(1) Length L0(mm) | 180 | — | 90 | — | 340 | 150 | 450 | 180 |
| Central angle (deg) corresponding to L0/R | 55 | — | 27 | — | 101 | 45 | 135 | 55 |
| Expression (2) Length L0(mm) | — | 200 | — | 100 | — | — | — | — |
| Central angle (deg) corresponding to L0/R | — | 60 | — | 30 | — | — | — | — |
| Compensating RRO value Xj(mm) | 0.12 | 0.13 | 0.11 | 0.12 | 0.21 | 0.19 | 0.23 | 0.24 |
| Compensated RRO value X' (mm) (absolute value) | 0 | 0.01 | 0.01 | 0 | 0.01 | 0.01 | 0.01 | 0 |

R = 1200 mm,
n = 1,
a = 1,

The RRO value X(mm) and compensating RRO value Xj(mm) are also plotted in FIG. 9.

From the test results, it was confirmed that the RRO value of the target n-order component can be decreased to substantially zero.

As described above, according to the present invention, the radial run out of a wheel rim can be reduced to substantially zero by a simple and easy way, and as a result, the radial run out and radial force variation of a tire and rim assembly which are derived from the wheel rim may be effectively reduced.

What is claimed is:

1. A method of reducing an n-order component of a radial run out (RRO) of a wheel rim having a pair of bead seats for tire beads, comprising measuring a radial run out Y1 of one of the bead seats around the wheel rim, measuring a radial run out Y2 of the other bead seat around the wheel rim, finding an average Y of the radial run out Y1 and radial run out Y2 around the wheel rim, obtaining the peak-to-peak amplitude of the n-order component as RRO value X, finding minimum position(s) at which the n-order component becomes minimum and determining deep position(s) P on the wheel rim corresponding to the minimum position(s), determining the length L of a corrective tape as a value within a range of from 0.8 to 1.02 times a length L0, applying a corrective tape to one of or alternatively each of the bead seats at each said deep position P, wherein the corrective tape is made of a synthetic resin and has a thickness t of from 0.1 to 0.5 mm, and said length L0 is defined by the following precision expression (1) or alternatively simplified expression (2)

$$L0 = \frac{R}{\pi \times n} \times \arcsin\left(\frac{X}{t \times a \times 1.3}\right) \quad (1)$$

$$L0 = \frac{100 \times R \times X}{360 \times t \times a \times n} \quad \text{where } 0 < \frac{L0}{R} < 0.28 \quad (2)$$

wherein

L0 is a value in mm,

X is a value in mm, n is a positive integer of the order number of the n-order component, t is a value in mm, a is a multiplier which is 0.5 when the corrective tape is applied to one of the bead seats or 1.0 when the corrective tape is applied to both of the bead seats, R is the circumference in mm of the bead seat, pi is the circle ratio (=3.14159 - - - ), and the unit of the argument of arcsine is radian.

2. A method according to claim 1, wherein the order number of the n-order component is 1.

3. A method of improving radial run out (RRO) of a wheel rim having a pair of bead seats for tire beads, comprising measuring a radial run out Y1 of one of the bead seats around the wheel rim, measuring a radial run out Y2 of the other bead seat around the wheel rim, finding an average Y of the radial run out Y1 and radial run out Y2 around the wheel rim, analyzing the average Y around the wheel rim to find out an n-order component which is largest in the peak-to-peak amplitude, obtaining the peak-to-peak amplitude of the n-order component as RRO value X, finding minimum position(s) at which the n-order component becomes minimum and determining deep position(s) P on the wheel rim corresponding to the minimum position(s), determining the length L of a corrective tape as a value within a range of from 0.8 to 1.02 times a length L0, applying a corrective tape to one of or alternatively each of the bead seats at each said deep position P, wherein the corrective tape is made of a synthetic resin and has a thickness t of from 0.1 to 0.5 mm, and said length L0 is defined by the following precision expression (1) or alternatively simplified expression (2)

$$L0 = \frac{R}{\pi \times n} \times \arcsin\left(\frac{X}{t \times a \times 1.3}\right) \quad (1)$$

$$L0 = \frac{100 \times R \times X}{360 \times t \times a \times n} \quad \text{where } 0 < \frac{L0}{R} < 0.28 \quad (2)$$

wherein

L0 is a value in mm,

X is a value in mm, n is a positive integer of the order number of the n-order component, t is a value in mm, a is a multiplier which is 0.5 when the corrective tape is applied to one of the bead seats or 1.0 when the corrective tape is applied to both of the bead seats, R is the circumference in mm of the bead seat, pi is the circle ratio (=3.14159 - - - ), and the unit of the argument of arcsine is radian.

* * * * *